US012518703B2

(12) United States Patent
Zhang et al.

(10) Patent No.: US 12,518,703 B2
(45) Date of Patent: Jan. 6, 2026

(54) DRIVING METHOD AND APPARATUS, AND STORAGE MEDIUM

(71) Applicants: Hefei BOE Joint Technology Co., Ltd., Anhui (CN); BOE Technology Group Co., Ltd., Beijing (CN)

(72) Inventors: Yao Zhang, Beijing (CN); Wenchao Bao, Beijing (CN); Xiaolong Wei, Beijing (CN); Miao Liu, Beijing (CN); Cheng Xu, Beijing (CN); Qiang Fei, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/294,167

(22) PCT Filed: Sep. 26, 2022

(86) PCT No.: PCT/CN2022/121329

§ 371 (c)(1),
(2) Date: Feb. 1, 2024

(87) PCT Pub. No.: WO2024/065086

PCT Pub. Date: Apr. 4, 2024

(65) Prior Publication Data

US 2025/0095585 A1 Mar. 20, 2025

(51) Int. Cl.
*G09G 3/3258* (2016.01)
*G09G 3/20* (2006.01)

(52) U.S. Cl.
CPC ......... *G09G 3/3258* (2013.01); *G09G 3/2007* (2013.01); *G09G 2300/0452* (2013.01);
(Continued)

(58) Field of Classification Search
CPC ............... G09G 3/2007; G09G 3/3607; G09G 2320/0673; G09G 2320/0276; G09G 2320/0271
See application file for complete search history.

(56) References Cited

U.S. PATENT DOCUMENTS 10,311,786 B2 * 6/2019 Oh ...................... G09G 3/3258
2015/0379939 A1 12/2015 Takasugi et al.
(Continued)

FOREIGN PATENT DOCUMENTS

CN 105225631 A 1/2016
CN 105761678 A 7/2016
(Continued)

OTHER PUBLICATIONS

International Search Report for PCT/CN2022/121329 Mailed Jun. 16, 2023.

*Primary Examiner* — Kevin M Nguyen
(74) *Attorney, Agent, or Firm* — Ling Wu; Stephen Yang; Ling and Yang Intellectual Property

(57) ABSTRACT

A driving method and an apparatus, and a storage medium are provided. The driving method is applied to a pixel drive circuit, the pixel drive circuit including a drive transistor, the drive transistor including a second electrode and a third electrode; and the method includes: applying a data voltage acquired based on a reference gamma curve to the third electrode of the drive transistor, and applying a preset voltage to the second electrode of the drive transistor; a lowest voltage of the reference gamma curve is greater than a lowest voltage of a standard gamma curve, and the preset voltage is less than or equal to the lowest voltage of the reference gamma curve.

13 Claims, 10 Drawing Sheets

(52) U.S. Cl.
CPC . *G09G 2300/0842* (2013.01); *G09G 2310/08* (2013.01); *G09G 2320/0673* (2013.01)

(56) References Cited

U.S. PATENT DOCUMENTS

| | | | | |
|---|---|---|---|---|
| 2016/0189623 | A1 | 6/2016 | Miwa et al. | |
| 2017/0193900 | A1 | 7/2017 | Kwon et al. | |
| 2017/0193922 | A1 | 7/2017 | Pyeon | |
| 2018/0182297 | A1 | 6/2018 | Lee et al. | |
| 2021/0134214 | A1 | 5/2021 | Ban et al. | |
| 2021/0150971 | A1 * | 5/2021 | Pyun .................... | G09G 3/3233 |
| 2021/0335256 | A1 | 10/2021 | Yin | |
| 2022/0208090 | A1 * | 6/2022 | Lee ...................... | G09G 3/3208 |
| 2022/0223093 | A1 | 7/2022 | Tian et al. | |
| 2022/0406253 | A1 | 12/2022 | Yuan et al. | |

FOREIGN PATENT DOCUMENTS

| | | | |
|---|---|---|---|
| CN | 106228940 | A | 12/2016 |
| CN | 108242216 | A | 7/2018 |
| CN | 108847184 | A | 11/2018 |
| CN | 109961728 | A | 7/2019 |
| CN | 112820239 | A | 5/2021 |
| CN | 113168805 | A | 7/2021 |
| CN | 114758615 | A | 7/2022 |
| JP | 2005122076 | A | 5/2005 |
| KR | 20150064460 | A | 6/2015 |
| WO | 2022133812 | A1 | 6/2022 |

* cited by examiner

Apply a data voltage acquired based on a reference gamma curve to a third electrode of a drive transistor, and apply a preset voltage to a second electrode of the drive transistor; a lowest voltage of the reference gamma curve is greater than a lowest voltage of a standard gamma curve, and the preset voltage is less than or equal to the lowest voltage of the reference gamma curve

FIG. 6a

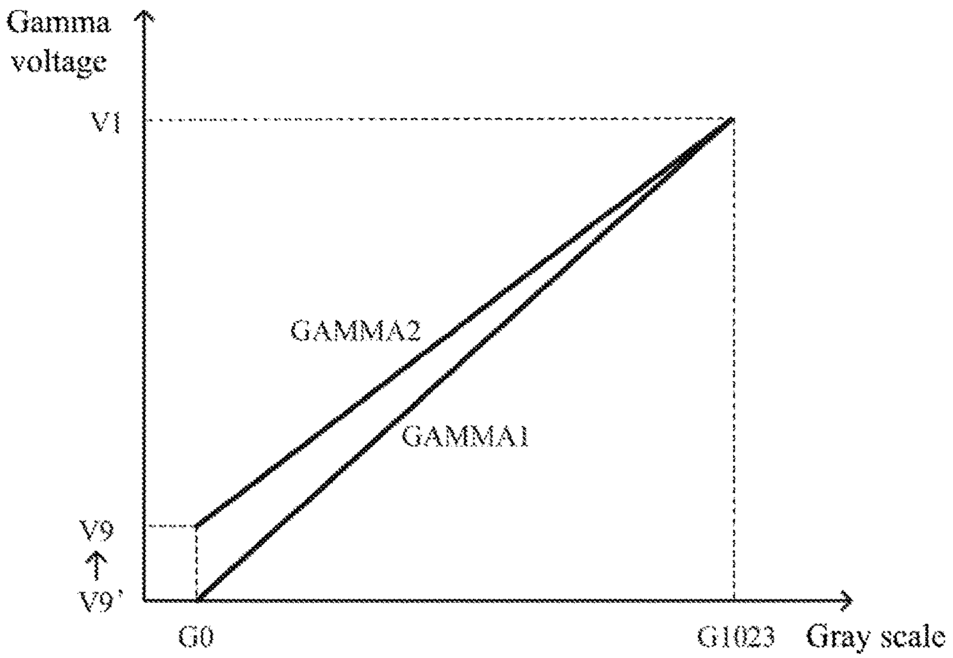

FIG. 6b

DRIVING METHOD AND APPARATUS, AND STORAGE MEDIUM

CROSS-REFERENCE TO RELATED APPLICATION

The present application is a U.S. National Phase Entry of International Application No. PCT/CN2022/121329 having an international filing date of Sep. 26, 2022, the entire content of which is hereby incorporated by reference.

TECHNICAL FIELD

Embodiments of the present disclosure relate to, but are not limited to, the field of display technologies, in particular to a driving method and an apparatus, and a storage medium.

BACKGROUND

Organic Light Emitting Diode (OLED) display panels have been widely applied due to characteristics such as self-luminescence, a low drive voltage, and a fast response, etc. The OLED display panels have been widely applied in a large-sized product with a display function, such as a computer, a television (TV), a medical monitoring apparatus, a laptop computer, and a vehicle-mounted central control apparatus, etc.

SUMMARY

The following is a summary of subject matters described herein in detail. The summary is not intended to limit the protection scope of claims.

In a first aspect, an embodiment of the present disclosure provides a driving method, applied to a pixel drive circuit, wherein the pixel drive circuit includes a drive transistor, the drive transistor including a second electrode and a third electrode; and the method includes: applying a data voltage acquired based on a reference gamma curve to the third electrode of the drive transistor, and applying a preset voltage to the second electrode of the drive transistor; a lowest voltage of the reference gamma curve is greater than a lowest voltage of a standard gamma curve, and the preset voltage is less than or equal to the lowest voltage of the reference gamma curve.

In an exemplary implementation, the preset voltage is greater than the lowest voltage of the standard gamma curve.

In an exemplary implementation, a highest voltage of the reference gamma curve is same as a highest voltage of the standard gamma curve.

In an exemplary implementation, the preset voltage is 2 volts to 5 volts.

In an exemplary implementation, the lowest voltage of the reference gamma curve is M times the highest voltage of the standard gamma curve, and the highest voltage of the reference gamma curve is N times the highest voltage of the standard gamma curve, wherein the M is greater than or equal to 0.18, the N is greater than or equal to 1, and the N is greater than the M.

In an exemplary implementation, the M is greater than or equal to 1, and the N is greater than or equal to 2.

In an exemplary implementation, a difference value between the N and the M is 0.6 to 1.5.

In an exemplary implementation, the lowest voltage of the reference gamma curve is 12 volts to 20 volts, and the highest voltage of the reference gamma curve is 28 volts to 36 volts.

In an exemplary implementation, the pixel drive circuit is configured to drive a light emitting element to emit light, the pixel drive circuit includes a first pixel drive circuit, a second pixel drive circuit, and a third pixel drive circuit; and applying the preset voltage to the second electrode of the drive transistor includes applying a first preset voltage to a second electrode of a drive transistor in the first pixel drive circuit, applying a second preset voltage to a second electrode of a drive transistor in the second pixel drive circuit, and applying a third preset voltage to a second electrode of a drive transistor in the third pixel drive circuit; the first preset voltage is greater than the second preset voltage, and the second preset voltage is greater than the third preset voltage.

In an exemplary implementation, the pixel drive circuit further includes a fourth pixel drive circuit, and applying the preset voltage to the second electrode of the drive transistor further includes applying a fourth preset voltage to a second electrode of a drive transistor in the fourth pixel drive circuit, the fourth preset voltage being less than the third preset voltage.

In an exemplary implementation, applying the data voltage acquired based on the reference gamma curve to the third electrode of the drive transistor includes: applying a data voltage acquired based on a first reference gamma curve to a third electrode of the drive transistor in the first pixel drive circuit; applying a data voltage acquired based on a second reference gamma curve to a third electrode of the drive transistor in the second pixel drive circuit; applying a data voltage acquired based on a third reference gamma curve to a third electrode of the drive transistor in the third pixel drive circuit; and applying a data voltage acquired based on a fourth reference gamma curve to a third electrode of the drive transistor in the fourth pixel drive circuit.

In an exemplary implementation, highest voltages of the first reference gamma curve to the fourth reference gamma curve are same.

In an exemplary implementation, a light emitting element driven by the first pixel circuit emits red light, a light emitting element driven by the second pixel circuit emits green light, a light emitting element driven by the third pixel circuit emits blue light, and a light emitting element driven by the fourth pixel circuit emits white light.

In an exemplary implementation, a value of the first preset voltage is 3.3 volts to 3.7 volts, a value of the second preset voltage is 3.2 volts to 3.6 volts, a value of the third preset voltage is 3 volts to 3.4 volts, and a value of the fourth preset voltage is 2.8 volts to 3.2 volts.

In an exemplary implementation, applying the data voltage acquired based on the reference gamma curve to the third electrode of the drive transistor includes: acquiring a gray scale value, selecting a gamma voltage corresponding to the gray scale value from multiple gamma voltages of the reference gamma curve, obtaining the data voltage according to the selected gamma voltage, and applying the data voltage to the third electrode of the drive transistor.

In an exemplary implementation, before applying the preset voltage to the second electrode of the drive transistor, the method further includes: acquiring a gray scale value, acquiring a first voltage and a second voltage according to the gray scale value, the reference gamma curve, and the standard gamma curve, wherein the first voltage is a gamma voltage corresponding to the gray scale value in the reference gamma curve, the second voltage is a standard gamma voltage corresponding to the gray scale value in the standard gamma curve, and the first voltage is greater than the second voltage; and using a difference value between the first voltage and the second voltage as the preset voltage.

In a second aspect, an embodiment of the present disclosure also provides another driving method, applied to a pixel drive circuit, wherein the method includes: acquiring a first sensed data and a first compensation data corresponding to the first sensed data, wherein the first compensation data is a difference value between a pre-stored highest sensed data and a theoretical sensed data corresponding to the first sensed data; and compensating the first sensed data by using the first compensation data to obtain a compensated sensed data.

In an exemplary implementation, after obtaining the compensated sensed data, the method further includes: calculating a second compensation data according to the compensated sensed data.

In an exemplary implementation, the pixel drive circuit includes a drive transistor, wherein the drive transistor includes a third electrode; and after calculating the second compensation data according to the compensated sensed data, the method further includes: acquiring an image data, compensating the image data according to the second compensation data to obtain a compensated image data, obtaining a data voltage according to the compensated image data, and applying the data voltage to the third electrode of the drive transistor.

In an exemplary implementation, the second compensation data is calculated according to the compensated sensed data by the following formula:

$$K = \frac{1}{a\sqrt{VSMP}},$$

wherein K is the second compensation data, a is a constant, and VSMP is a value of the compensated sensed data.

In an exemplary implementation, the pixel drive circuit includes a drive transistor, wherein the drive transistor includes a third electrode; and before acquiring the first sensed data, the method further includes: acquiring multiple voltage data of the third electrode of the drive transistor and multiple theoretical sensed data corresponding to the multiple voltage data; and acquiring difference values between a second sensed data and the multiple theoretical sensed data to obtain first compensation data corresponding to the multiple voltage data; the second sensed data is a maximum sensed data among the multiple theoretical sensed data.

In an exemplary implementation, acquiring the first compensation data corresponding to the first sensed data includes: finding a corresponding voltage data of the third electrode according to the first sensed data, and finding a corresponding first compensation data according to the voltage data of the third electrode.

In an exemplary implementation, acquiring the first compensation data corresponding to the first sensed data includes: obtaining the first compensation data by subtracting the first sensed data from the pre-stored maximum sensed data, or, finding a corresponding theoretical sensed data according to the first sensed data, and finding a corresponding first compensation data according to the theoretical sensed data.

In an exemplary implementation, compensating the first sensed data by using the first compensation data to obtain the compensated sensed data includes: adding the first compensation data on the basis of the first sensed data to obtain the compensated sensed data.

In a third aspect, an embodiment of the present disclosure also provides a drive apparatus, applied to a pixel drive circuit, wherein the pixel drive circuit includes a drive transistor, the drive transistor including a second electrode and a third electrode; and the apparatus includes: a drive circuit, a control circuit, and a memory; the memory is connected with the control circuit and is configured to store a preset voltage; the drive circuit is connected with the pixel drive circuit and is configured to apply a data voltage acquired based on a reference gamma curve to the third electrode of the drive transistor; a lowest voltage of the reference gamma curve is greater than a lowest voltage of the standard gamma curve; the control circuit is connected with the memory and is configured to apply the preset voltage to the second electrode of the drive transistor; and the preset voltage is less than or equal to the lowest voltage of the reference gamma curve.

In a fourth aspect, an embodiment of the present disclosure also provides a drive apparatus, applied to a pixel drive circuit, wherein the pixel drive circuit includes a drive transistor, the drive transistor including a second electrode and a third electrode; and the apparatus includes a first memory, a first processor, and a first computer program stored on the first memory and capable of being run on the first processor to perform following operations: applying a data voltage acquired based on a reference gamma curve to the third electrode of the drive transistor, and applying a preset voltage to the second electrode of the drive transistor; wherein a lowest voltage of the reference gamma curve is greater than a lowest voltage of a standard gamma curve, and the preset voltage is less than or equal to the lowest voltage of the reference gamma curve.

In a fifth aspect, an embodiment of the present disclosure also provides a drive apparatus, including: a control circuit, a compensation circuit, and a memory; the memory is connected with the control circuit and is configured to store difference values between a maximum sensed data and multiple theoretical sensed data; the control circuit is connected with the memory and the compensation circuit, and is configured to acquire a first sensed data and a first compensation data corresponding to the first sensed data, wherein the first compensation data is a difference value between a pre-stored maximum sensed data and a theoretical sensed data corresponding to the first sensed data; and the compensation circuit is connected with the control circuit and is configured to compensate the first sensed data by using the first compensation data to obtain a compensated sensed data.

In a sixth aspect, an embodiment of the present disclosure also provides a drive apparatus, including a second memory, a second processor, and a second computer program stored on the second memory and capable of being run on the second processor, to perform following operations: acquiring a first sensed data and a first compensation data corresponding to the first sensed data, wherein the first compensation data is a difference value between a pre-stored maximum sensed data and a theoretical sensed data corresponding to the first sensed data; and compensating the first sensed data by using the first compensation data to obtain a compensated sensed data.

In a seventh aspect, an embodiment of the present disclosure also provides a non-transitory computer-readable storage medium, configured to store computer program instructions, wherein when the computer program instructions are executed, the driving method according to any one of the above embodiments can be implemented.

After accompanying drawings and detailed descriptions are read and understood, other aspects may be understood.

BRIEF DESCRIPTION OF DRAWINGS

Accompanying drawings are intended to provide further understanding of technical solutions of the present disclosure and form a part of the specification, and are used to explain the technical solutions of the present disclosure together with embodiments of the present disclosure, but do not form limitations on the technical solutions of the present disclosure. Shapes and sizes of each component in the drawings do not reflect actual scales, but are only intended to schematically illustrate contents of the present disclosure.

FIG. 6*a* shows a flowchart of a driving method according to an exemplary embodiment of the present disclosure.

FIG. 6*b* is a schematic diagram of a reference gamma curve according to an exemplary embodiment of the present disclosure.

DETAILED DESCRIPTION

Figure 1:
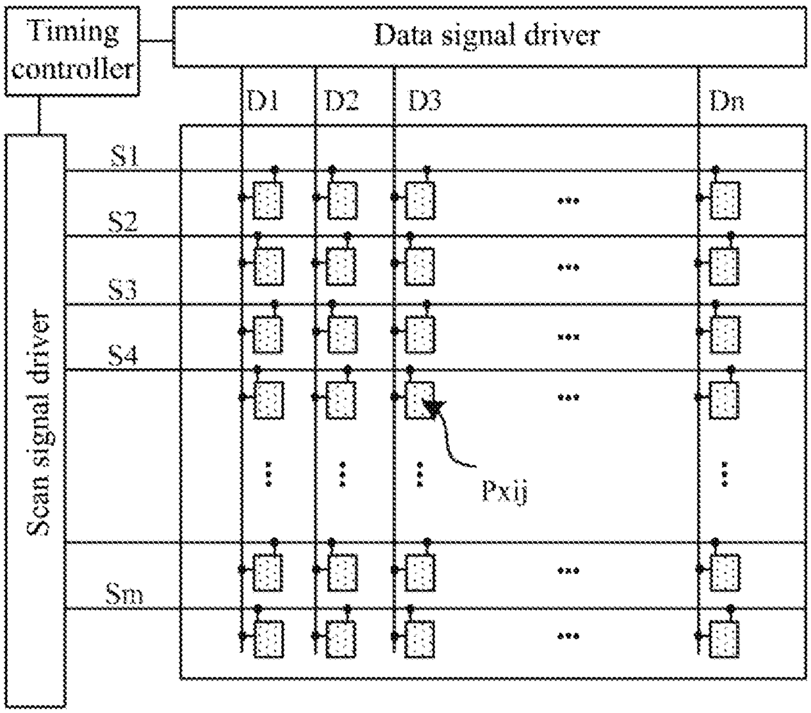
FIG. 1 is a schematic diagram of a structure of a display apparatus.

Embodiments of the present disclosure will be described in detail hereinafter with reference to the drawings. Implementations may be implemented in multiple different forms. Those of ordinary skill in the art can very easily understand a fact that modes and contents may be transformed into various forms without departing from the purpose of the present disclosure and the scope thereof. Therefore, the present disclosure should not be explained as being limited to contents recorded in following implementations only. The embodiments in the present disclosure and features in the embodiments may be randomly combined with each other in a situation of no conflicts. In order to keep the following description of the embodiments of the present disclosure clear and concise, detailed descriptions of part of known functions and known components are omitted in the present disclosure. The drawings in the embodiments of the present disclosure relate only to structures involved in the embodiments of the present disclosure, and other structures may refer to a general design.

Ordinal numerals "first", "second", "third", etc., in the specification are set to avoid confusion of composition elements, but not to form limits on the quantity.

In the specification, unless otherwise specified and defined, terms "mounting", "mutual connection", and "connection" should be understood in a broad sense. For example, it may be fixed connection, or detachable connection, or integral connection; may be mechanical connection or electric connection; or may be direct connection, or indirect connection through a middle ware, or inner communication of two elements. Those of ordinary skill in the art can understand specific meanings of the above terms in the present disclosure according to specific situations.

In the specification, "electric connection" includes a situation in which composition elements are connected together through an element with a certain electric action. "An element with a certain electric action" is not particularly limited as long as electric signals between the connected composition elements may be sent and received. Examples of the "element with a certain electric action" not only include an electrode and a wiring, but also may include a switch element such as a transistor or the like, a resistor, an inductor, a capacitor, another element with one or more functions, or the like.

In the embodiments of the present disclosure, a transistor refers to an element that at least includes three terminals, i.e., a gate electrode, a drain electrode, and a source electrode. A transistor has a channel region between a drain electrode (or referred to as a drain electrode terminal, a drain connection region, or a drain) and a source electrode (or referred to as a source electrode terminal, a source connection region, or a source), and a current can flow through the drain electrode, the channel region, and the source electrode. In the embodiments of the present disclosure, a channel region refers to a region through which a current mainly flows.

In the embodiments of the present disclosure, a first electrode may be a drain electrode while a second electrode may be a source electrode, or a first electrode may be a source electrode while a second electrode may be a drain electrode; and a third electrode may be a control electrode. Functions of the "source electrode" and the "drain electrode" are sometimes interchangeable with each other in a situation in which transistors with opposite polarities are used or a current direction changes during working of a circuit. Therefore, in the embodiments of the present disclosure, the "source electrode" and the "drain electrode" are interchangeable. The "source electrode" and the "drain electrode" may be referred to as a "source" and a "drain", and the gate electrode may be referred to as a control electrode or a third electrode.

FIG. 1 is a schematic diagram of a structure of a display apparatus. As shown in FIG. 1, an OLED display apparatus may include a timing controller, a data signal driver, a scan signal driver, and a pixel array. The pixel array may include multiple scan signal lines (S1 to Sm), multiple data signal lines (D1 to Dn), and multiple sub-pixels Pxij. In an exemplary implementation, the timing controller may provide the data signal driver with a gray scale value and a control signal which are suitable for a specification of the data signal driver, and provide the scan signal driver with a clock signal, a scan start signal, etc., which are suitable for a specification of the scan signal driver. The data signal driver may generate data voltages to be provided to the data signal lines D1, D2, D3, . . . , and Dn using the gray scale value and the control signal received from the timing controller. For example, the data signal driver may sample gray scale values using the clock signal and apply the data voltages corresponding to the gray scale values to the data signal lines D1 to Dn by taking a row of sub-pixels as a unit, wherein n may be a natural number. The scan signal driver may generate scan signals to be provided to the scan signal lines S1, S2, S3, . . . , and Sm by receiving the clock signal, the scan start signal, etc., from the timing controller. For example, the scan signal driver may sequentially provide scan signals with turning-on-level pulses to the scan signal lines S1 to Sm. For example, the scan signal driver may be constructed in a form of a shift register, and generate the scan signals in a mode of sequentially transmitting the scan start signal provided in a form of turning-on-level pulses to a next-stage circuit under controlling of the clock signal, wherein m may be a natural number. A sub-pixel array may include multiple sub-pixels PXij. Each sub-pixel PXij may be connected to a corresponding data signal line and a corresponding scan signal line, wherein i and j may be natural numbers. The sub-pixel Pxij may refer to a sub-pixel in which a transistor is connected to both an i-th scan signal line and a j-th data signal line.

Figure 2:
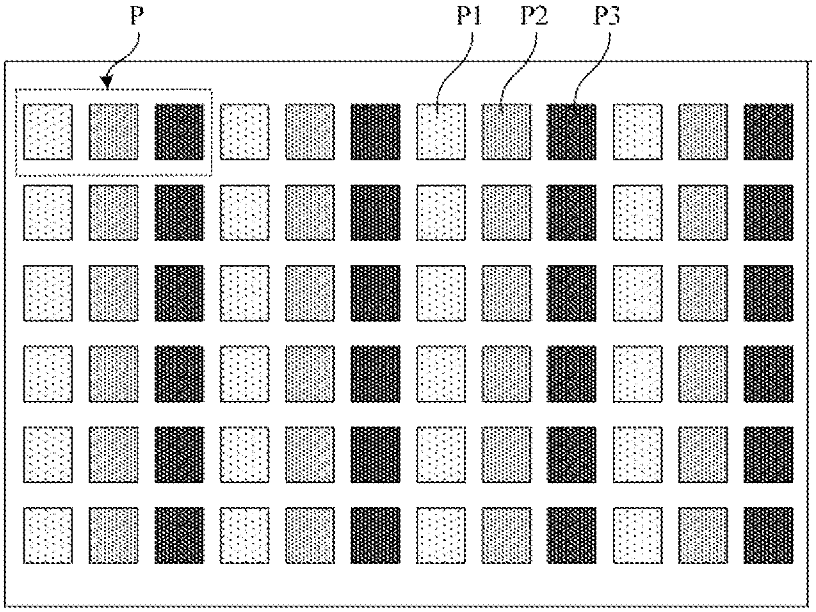
FIG. 2 is a schematic diagram of a planar structure of a display substrate.

FIG. 2 is a schematic diagram of a planar structure of a display substrate. As shown in FIG. 2, the display substrate may include multiple pixel units P arranged in a matrix, at least one of the multiple pixel units P includes a first sub-pixel P1 emitting light of a first color, a second sub-pixel P2 emitting light of a second color, and a third sub-pixel P3 emitting light of a third color, and the first sub-pixel P1, the second sub-pixel P2, and the third sub-pixel P3 each includes a pixel drive circuit and a light emitting device. Pixel drive circuits in the first sub-pixel P1, the second sub-pixel P2, and the third sub-pixel P3 are respectively connected with a scan signal line and a data signal line. The pixel drive circuit is configured to receive a data voltage transmitted by the data signal line and output a corresponding current to the light emitting device under controlling of the scan signal line. Light emitting devices in the first sub-pixel P1, the second sub-pixel P2, and the third sub-pixel P3 are respectively connected with the pixel drive circuit of the sub-pixel in which the light emitting device is located, and the light emitting device is configured to emit light with a corresponding brightness in response to a current outputted by the pixel drive circuit of the sub-pixel in which the light emitting device is located.

Figure 3:
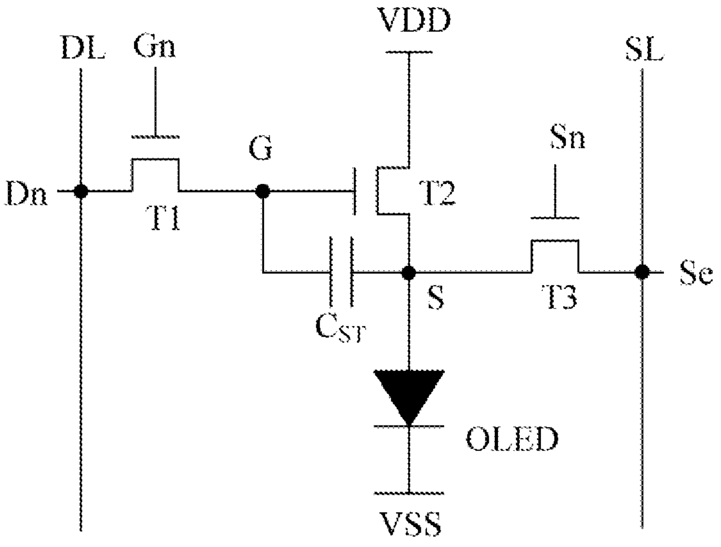
FIG. 3 is a schematic diagram of an equivalent circuit of a pixel drive circuit.

In an exemplary implementation, the pixel drive circuit may be of a structure of 3T1C, 4T1C, 5T1C, 5T2C, 6T1C, or 7T1C. FIG. 3 is a schematic diagram of an equivalent circuit of a pixel drive circuit. As shown in FIG. 3, the pixel drive circuit is of a 3T1C structure, and may include three transistors (a first transistor T1, a second transistor T2, and a third transistor T3), one storage capacitor $C_{ST}$, and six signal lines (a data signal line Dn, a first scan signal line Gn, a second scan signal line Sn, a compensation signal line Se, a first power supply line VDD, and a second power supply line VSS). In an exemplary implementation, the first transistor T1 is a switch transistor, the second transistor T2 is a drive transistor, and the third transistor T3 is a compensation transistor. A gate electrode of the first transistor T1 is coupled to the first scan signal line Gn, a first electrode of the first transistor T1 is coupled to the data signal line Dn, and a second electrode of the first transistor T1 is coupled to a gate electrode of the second transistor T2. The first transistor T1 is configured to receive a data signal transmitted by the data signal line Dn under controlling of the first scan signal line Gn, so that the gate electrode of the second transistor T2 receives the data signal. The gate electrode of the second transistor T2 is coupled to the second electrode of the first transistor T1, a first electrode of the second transistor T2 is coupled to the first power supply line VDD, and a second electrode of the second transistor T2 is coupled to a first electrode of an OLED. The second transistor T2 is configured to generate a corresponding current at the second electrode under controlling of the data signal received by its gate electrode. A gate electrode of the third transistor T3 is coupled to the second scan signal line Sn, a first electrode of the third transistor T3 is coupled to the compensation signal line Se, and a second electrode of the third transistor T3 is coupled to the second electrode of the second transistor T2. The third transistor T3 is configured to extract a threshold voltage Vth and a mobility of the second transistor T2 in response to compensation timing to compensate the threshold voltage Vth. The first electrode of the OLED is coupled to the second electrode of the second transistor T2, and a second electrode of the OLED is coupled to the second power supply line VSS. The OLED is configured to emit light with a corresponding brightness in response to a current of the second electrode of the second transistor T2. A first electrode of the storage capacitor $C_{ST}$ is coupled to the gate electrode of the second transistor T2, and a second electrode of the storage capacitor $C_{ST}$ is coupled to the second electrode of the second transistor T2. The storage capacitor $C_{ST}$ is configured to store a potential of the gate electrode of the second transistor T2.

Figure 4:
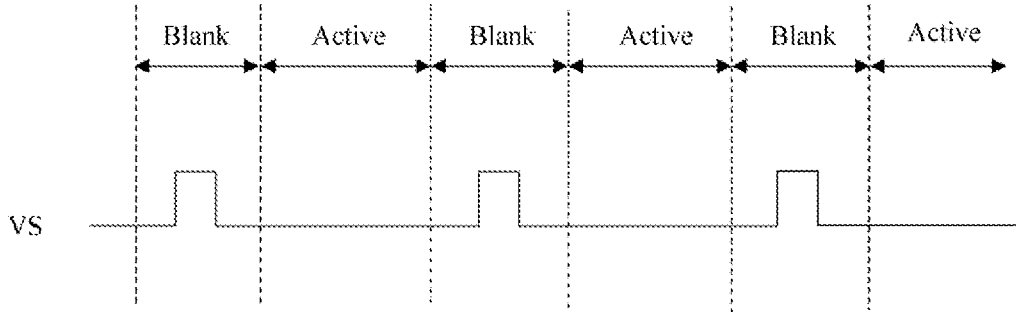
FIG. 4 is a schematic diagram of working timing of a display panel.

An OLED display panel generally includes multiple sub-pixels, wherein at least one sub-pixel includes a pixel drive circuit and a light emitting element connected with the pixel drive circuit, the pixel drive circuit includes a drive transistor, and a gate-source voltage ($V_{GS}$) of the drive transistor controls turn-on or turn-off of the drive transistor and controls a magnitude of a drive current flowing through the turned-on drive transistor, the magnitude of the drive current affects a brightness of light emitted by the light emitting element. In a practical application, deviations of characteristics (such as a threshold voltage and a mobility) of the drive transistors in the pixel drive circuits are caused due to a technological process difference and other factors. In order to avoid a deviation of a brightness of a display picture caused by a deviation of a characteristic of the drive transistor, characteristic parameters (a mobility and a threshold voltage) of the drive transistors in the pixel drive circuits are detected externally, and a voltage outputted to the pixel drive circuit is corrected according to the detected characteristic parameters, so as to eliminate a brightness difference and improve a display uniformity. As shown in FIGS. 3 and 4, the first transistor T1 and the third transistor T3 are turned on in a blanking interval of a display stage (which may be referred to as Blank, located between two adjacent picture display stages (Actives)), and a voltage is outputted to a spot G through the data signal line to change a potential at the spot G, thereby avoiding a brightness difference caused by differences of the characteristic parameters of the drive transistors and improving the display uniformity. However, in a process of displaying a dynamic picture, in a situation in which pictures of different colors and different gray scales are switched, horizontal stripes often appear, which seriously affects a display effect of a display panel. A display quality of the picture is not high, and a user experience is relatively poor.

An embodiment of the present disclosure provides a driving method, which may be applied to a pixel drive circuit, wherein the pixel drive circuit includes a drive transistor, the drive transistor includes a second electrode and a third electrode; and as shown in FIG. 6*a*, the method may include: applying a data voltage acquired based on a reference gamma curve to the third electrode of the drive transistor, and applying a preset voltage to the second electrode of the drive transistor; wherein a lowest voltage of the reference gamma curve is greater than a lowest voltage of a standard gamma curve, and the preset voltage is less than or equal to the lowest voltage of the reference gamma curve.

With the driving method according to an embodiment of the present disclosure, by applying the data voltage acquired based on the reference gamma curve to the third electrode of the drive transistor, and applying the preset voltage to the second electrode of the drive transistor, the lowest voltage of the reference gamma curve is greater than the lowest voltage of the standard gamma curve, and the preset voltage is less than or equal to the lowest voltage of the reference gamma curve, a technical problem that horizontal stripes appear in a process of displaying a picture is overcome, improving a display quality of the picture.

Figure 5:
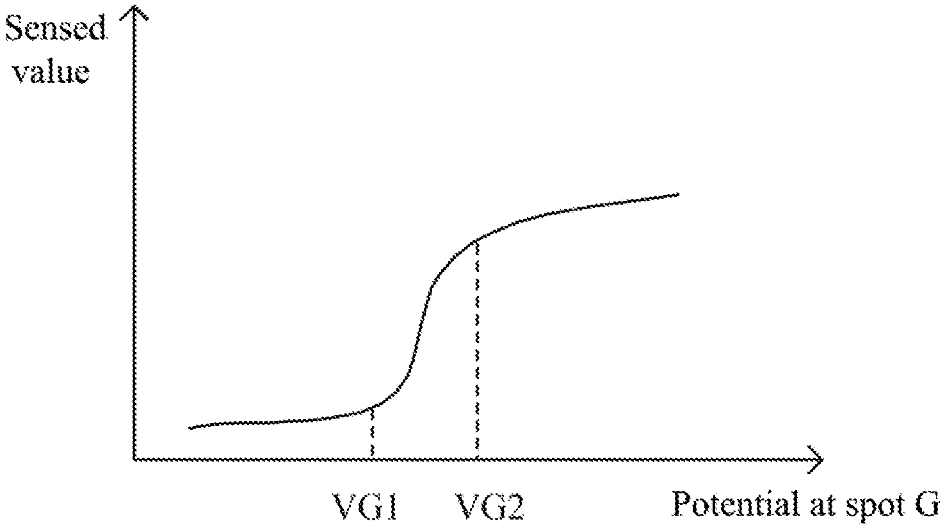
FIG. 5 shows a schematic diagram of a relationship between a potential at a spot G and a sensed value.

In an actual working process, it is found that a generation of transverse stripes is due to a relatively large difference of sensed values at different moments (i.e., a voltage value sensed by the sensing line SL in FIG. 3). The large difference of the sensed values leads to a relatively large difference of K values (which may be mobilities detected by an external compensation) derived from the sensed values. However, a factor causing the relatively large difference of the sensed values is a voltage at the third electrode of the drive transistor (i.e., a voltage at the spot G in FIG. 3), and after the voltage at the spot G reaches a numerical value, the difference of the sensed values will not change too much. As shown in FIG. 5, a potential at the spot G is higher than a potential of VG2 and lower than a potential of VG1, and a difference of sensed values corresponding to different potentials at the spot G is not large. After research, it is found that it is relatively difficult to reduce a potential at the spot G, it is relatively easy to raise the potential at the spot G, and a voltage at the second electrode of the drive transistor T2 (i.e. a potential at a spot S) will not produce too much effect on a sensed value or a K value. In the solution according to an embodiment of the present disclosure, relative to the standard gamma curve, the lowest voltage of the reference gamma curve is raised, and a preset voltage less than or equal to the lowest voltage of the reference gamma curve is applied to the second electrode of the drive transistor, so that a voltage of a lowest potential at the spot G is greater than VG2, so that a difference of sensed values will not be very large due to a change of potentials at the spot G, and the potential of the spot S is raised, so that a gate-source voltage $V_{GS}$ of the drive transistor T2 remains unchanged or has little change, which will not produce an influence on a brightness of the light emitting diode OLED, or, even produces an influence on the brightness of the organic light emitting diode OLED but the influence is not large, an influence on a display effect may basically be omitted. Therefore, by the technical solution according to an embodiment of the present disclosure, a problem that a large difference of sensed values caused by different voltages applied to the third electrode of the drive transistor may be reduced without affecting the display effect, overcoming a technical problem that horizontal stripes appear due to a large difference of sensed values when the display panel displays a picture.

In an exemplary implementation, the preset voltage is greater than the lowest voltage of the standard gamma curve.

As shown in FIG. 6*b*, GAMMA1 is a standard gamma curve, GAMMA2 is a reference gamma curve, a lowest voltage of the reference gamma curve GAMMA2 is V9, and a lowest voltage of the standard gamma curve GAMMA1 is V9', wherein a difference value of V9-V9' is approximately a voltage value of VG2 in FIG. 5, that is, the lowest voltage of the reference gamma curve GAMMA2 is V9, which is raised by V9-V9' compared with the lowest voltage of the standard gamma curve GAMMA1 of V9'. In an embodiment of the present disclosure, a voltage at a spot VG2 in FIG. 6*b* may be referred to as a saturation voltage of the drive transistor T2.

Figure 6C:
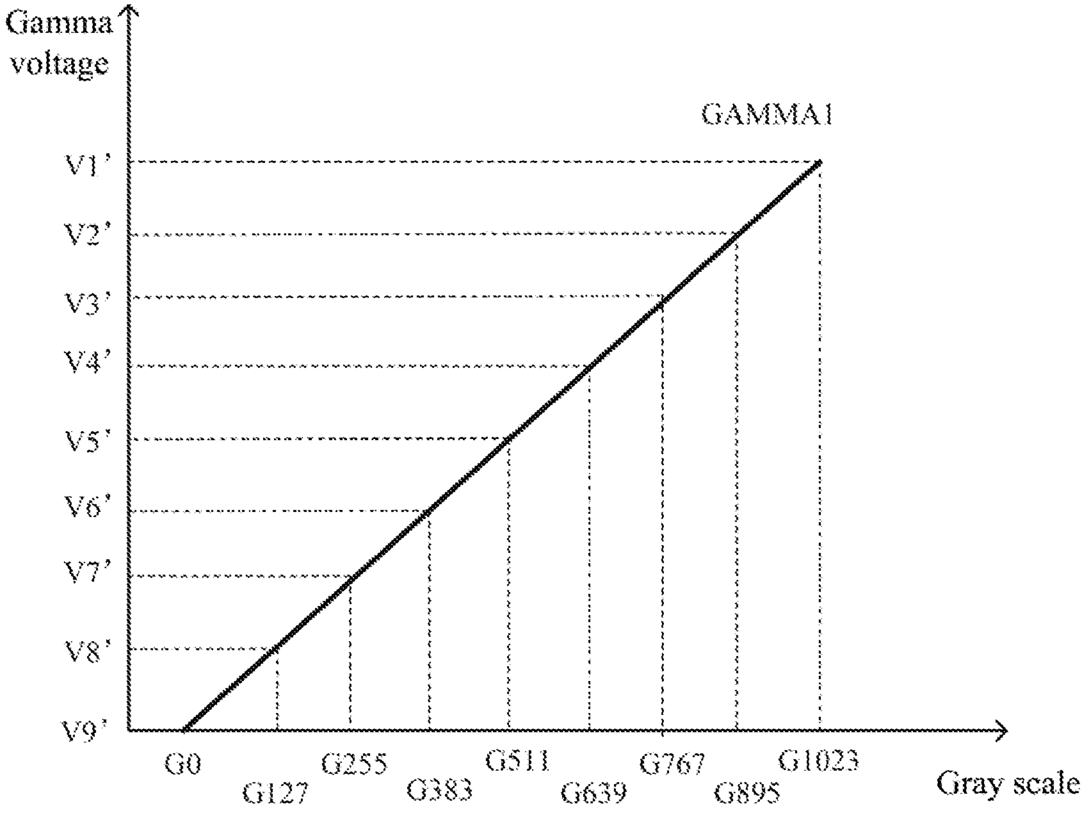
FIG. 6*c* is a schematic diagram of a reference gamma curve according to an exemplary embodiment.

In an exemplary implementation, abscissas in FIGS. 6*b* and 6*c* represent gray scales, and ordinates represent gamma voltages corresponding to different gray scales. The standard gamma curve GAMMA1 shown in FIG. 6*c* has a lowest voltage V9' of 0V and a highest voltage V1' of 16V. The standard gamma curve GAMMA1 may be a straight line, and a value range of ordinates is 0V to 16V. In an exemplary implementation, a highest voltage V1 in the reference gamma voltage GAMMA2 may be the same as the highest voltage V1' in the standard gamma curve GAMMA1. In the standard gamma curve GAMMA1, the gamma voltage V9' corresponding to a gray scale G0 may be 0V, a gamma voltage V8' corresponding to a gray scale G127 may be 2V, a gamma voltage V7' corresponding to a gray scale G255 may be 4V, a gamma voltage V6' corresponding to a gray scale G383 may be 6V, a gamma voltage V5' corresponding to a gray scale G511 may be 8V, a gamma voltage V4' corresponding to a gray scale G639 may be 10V, a gamma voltage V3' corresponding to a gray scale G767 may be 12V, a gamma voltage V2' corresponding to a gray scale G895 may be 14V, and the gamma voltage V1' corresponding to a gray scale G1023 may be 16V. In an exemplary implementation, nine voltage values from the lowest voltage V9' to the highest voltage V1' in the standard gamma curve GAMMA1 may be adjusted according to an actual situation.

In an exemplary implementation, the standard gamma voltage curve GAMMA1 and the reference gamma voltage GAMMA2 may be straight lines, i.e. linear curves, or may be non-straight lines, i.e. non-linear curves.

In an exemplary implementation, as shown in FIG. 6*b*, the highest voltage of the reference gamma curve and the highest voltage of the standard gamma curve may be the same, that is, the highest voltage of the reference gamma curve and the highest voltage of the standard gamma curve are both the voltage V1 in FIG. 6*b*.

In an exemplary implementation, the preset voltage may be equal to the lowest voltage of the reference gamma curve, and the preset voltage may be 2 volts to 5 volts, for example, the preset voltage may be one of values of 2V, 3V, 3.2 V, 3.5 V, 4V. As shown in FIGS. 3 and 6*b*, in the situation in which the lowest voltage V9' in the standard gamma curve GAMMA1 is 0V, the preset voltage may be set to a fixed value equal to the lowest voltage of the reference gamma curve GAMMA2, i.e. the preset voltage may be V9-V9' (approximately equal to a value of VG2 in FIG. 3). Since all voltages on the reference gamma curve GAMMA2 are greater than the preset voltage (i.e. the lowest voltage of the reference gamma curve GAMMA2), and a potential applied to the G spot is a data voltage obtained based on a second gamma curve GAMMA2 (applied to the spot G through the data signal line DL after being converted into a data voltage based on the second gamma curve GAMMA2), corresponding to FIG. 3, herein the lowest voltage of the reference gamma curve GAMMA2 approaches VG2, which causes that all potentials applied to the spot G are greater than or equal to VG2. Since in a situation in which a potential at the spot G is higher than VG2, there is little difference of sensed values, such that a difference of the sensed values (i.e., sensed voltages) will not be very large due to a change of the potential at the spot G, which avoids to a great extent that horizontal stripes appear during the picture caused by a large difference of the sensed values.

In an exemplary implementation, a driver chip receives a gamma voltage, and performs a digital-to-analog conversion on the gamma voltage through a DA conversion module (i.e., a digital-to-analog conversion module) to obtain a data voltage, wherein, a digital bit width of the digital-to-analog conversion module may be of Z bits, Z may be referred to as a color depth, and a display panel of Z bits may represent 2 to the Z-th power brightness levels. For example, a value of Z may be 8 or 10, that is, a digit of the digital-to-analog conversion module is of 8 bits or 10 bits, the display panel with the color depth of 8 bits may represent 2 to the 8th power (equal to 256) brightness levels, wherein the 256 brightness levels may be referred to as 256 gray scales; and the display panel with the color depth of 10 bits may represent 2 to the 10th power (equal to 1024) brightness levels, wherein the 1024 brightness levels may be referred to as 1024 gray scales.

As shown in FIG. 6*b*, taking the color depth of 10 bits as an example, an indexing value of the reference gamma curve GAMMA2 may be $$LSB2 = \frac{V1 - V9}{2^{10} - 1},$$

wherein LSB2 is the indexing value of the reference gamma curve, V1 is the highest voltage of the reference gamma curve GAMMA2, and V9 is the lowest voltage of the reference gamma curve GAMMA2. The reference gamma curve GAMMA2 may be a straight line, for example, a value of the highest voltage V1 is 16V and a value of the lowest voltage V9 is 3V, then the indexing value is $$LSB = \frac{16 - 3}{2^{10} - 1}.$$

A value of the highest voltage V1 of the standard gamma curve GAMMA1 is 16V and a value of the lowest voltage V9 is 0V, then an indexing value of the standard gamma curve GAMMA1 is $$LSB1 = \frac{16 - 0}{2^{10} - 1},$$

wherein LSB1 is the indexing value of the standard gamma curve. An indexing value is a voltage represented by each bit, that is, a degree of subdividing an analog voltage. Comparing LSB2 with LSB1, it is not difficult to find that the indexing value of LSB2 is smaller, gray scales have a more detailed expansion, and the display effect is better.

Figure 7:
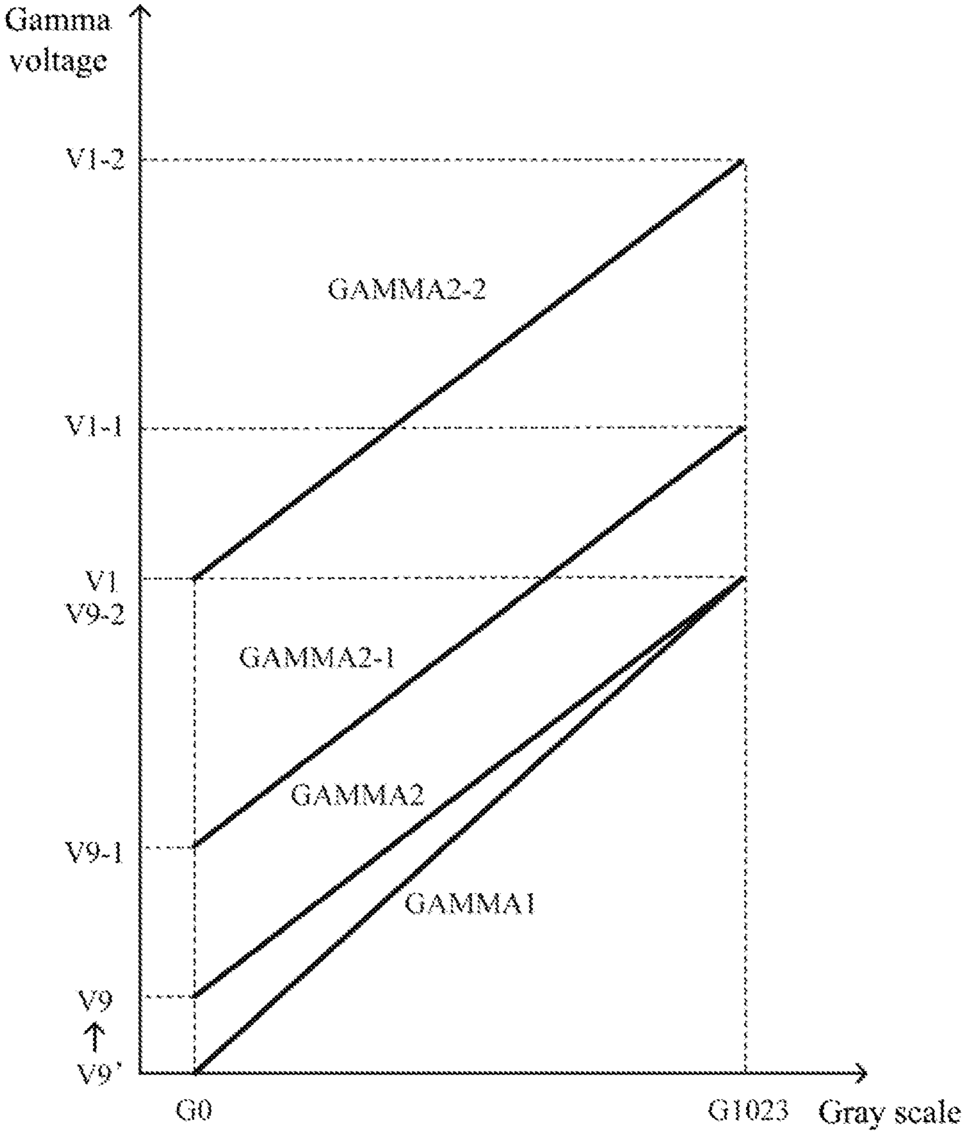
FIG. 7 is a schematic diagram of a reference gamma curve according to an exemplary embodiment of the present disclosure.

In an exemplary implementation, the lowest voltage of the reference gamma curve is M times the highest voltage of the standard gamma curve, and the highest voltage of the reference gamma curve is N times the highest voltage of the standard gamma curve, M being greater than or equal to 0.18, N being greater than or equal to 1, and N being greater than M, and a potential at the spot G and a voltage of the reference gamma curve may be adjusted according to actual needs to be suitable for different pixel drive circuits. As shown in FIG. 7, the reference gamma curve may be GAMMA2-1, a lowest voltage V9-1 of the reference gamma curve GAMMA2-1 may be 0.2 times or 0.3 times or 0.5 times the highest voltage V1 of the standard gamma curve GAMMA1, and a lowest voltage V9-1 of the reference gamma curve GAMMA2-1 is greater than the lowest voltage V9' of the standard gamma curve GAMMA1; and a highest voltage V1-1 of the reference gamma curve GAMMA2-1 may be 1.2 times or 1.5 times or 1 times the highest voltage V1 of the standard gamma curve GAMMA1.

In an exemplary implementation, M is greater than or equal to 1, N is greater than or equal to 2, as shown in FIG. 7, the reference gamma curve may be GAMMA2-2, a lowest voltage V9-2 of the reference gamma curve GAMMA2-2 may be 1 times the highest voltage V1 of the standard gamma curve GAMMA1 (i.e., values of V9-2 and V1 may be equal), and a highest voltage V1-2 of the reference gamma curve GAMMA2-2 may be 2 times or 1.5 times or 2.5 times the highest voltage V1 of the standard gamma curve GAMMA1.

In an exemplary implementation, a difference value between N and M is 0.6 to 1.5, for example, M is 1 and N is 2.

In an exemplary implementation, the lowest voltage of the reference gamma curve is 12 volts to 20 volts, and the highest voltage of the reference gamma curve is 28 volts to 36 volts. As shown in the reference gamma curve GAMMA2-2 in FIG. 7, the lowest voltage V9-2 of the reference gamma curve GAMMA2-2 may be 16V, and the highest voltage V1-2 of the reference gamma curve GAMMA2-2 may be 32V.

In an exemplary implementation, the lowest voltage V9' of the standard gamma curve GAMMA1 may be 0V or 0.25 V, and the lowest voltage V1 of the standard gamma curve GAMMA1 may be 16V.

In an exemplary implementation, the pixel drive circuit may be configured to drive the light emitting element OLED to emit light, and the pixel drive circuit may include a first pixel drive circuit, a second pixel drive circuit, and a third pixel drive circuit. Applying a preset voltage to the second electrode of the drive transistor may include applying a first preset voltage to a second electrode of a drive transistor in the first pixel drive circuit, applying a second preset voltage to a second electrode of a drive transistor in the second pixel drive circuit, and applying a third preset voltage to a second electrode of a drive transistor in the third pixel drive circuit; the first preset voltage is greater than the second preset voltage, and the second preset voltage is greater than the third preset voltage.

In an exemplary implementation, the pixel drive circuit may further include a fourth pixel drive circuit, and applying a preset voltage to the second electrode of the drive transistor may further include applying a fourth preset voltage to a second electrode of a drive transistor in the fourth pixel drive circuit, the fourth preset voltage being less than the third preset voltage.

In an exemplary implementation, applying a data voltage acquired based on a reference gamma curve to the third electrode of the drive transistor may include: applying a data voltage acquired based on a first reference gamma curve to a third electrode of the drive transistor in the first pixel drive circuit; applying a data voltage acquired based on a second reference gamma curve to a third electrode of the drive transistor in the second pixel drive circuit; applying a data voltage acquired based on a third reference gamma curve to a third electrode of the drive transistor in the third pixel drive circuit; and applying a data voltage acquired based on a fourth reference gamma curve to a third electrode of the drive transistor in the fourth pixel drive circuit.

Figure 8:
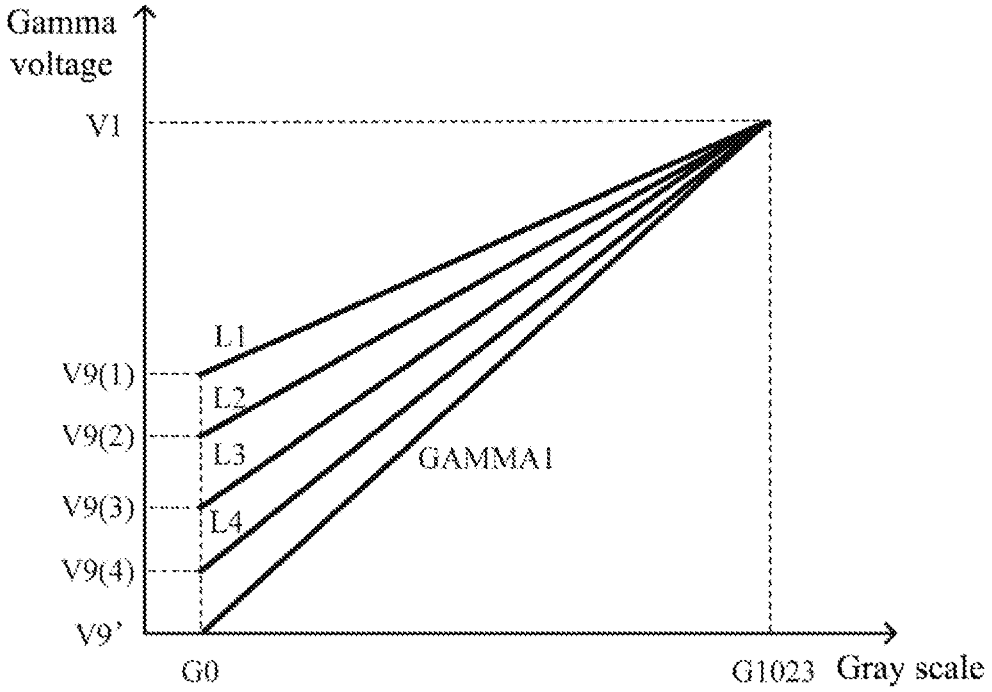
FIG. 8 is a schematic diagram of a reference gamma curve according to an exemplary embodiment of the present disclosure.

In an exemplary implementation, as shown in FIG. 8, highest voltages V1 of the first reference gamma curve L1 to the fourth reference gamma curve L4 may be the same. For example, the highest voltages V1 of the first reference gamma curve L1 to the fourth reference gamma curve L4 may be 16V. In an exemplary implementation, the highest voltages of the first reference gamma curve L1 to the fourth reference gamma curve L4 may be the same as the highest voltage of the standard gamma curve GAMMA1, and lowest voltages of the first reference gamma curve L1 to the fourth reference gamma curve L4 are all greater than the lowest voltage V9' of the GAMMA1. In an exemplary implementation, a lowest voltage V9(1) of the first gamma curve L1 is greater than a lowest voltage V9(2) of the second gamma curve L2, the lowest voltage V9(2) of the second gamma curve L2 is greater than a lowest voltage V9(3) of the third gamma curve L3, and the lowest voltage V9(3) of the third gamma curve L3 is greater than a lowest voltage V9(4) of the fourth gamma curve L4.

In an exemplary implementation, based on different wavelengths of light emitted by light emitting elements, different light emitting efficiencies, and different light emitting areas of different sub-pixels in the OLED display panel, values of saturation voltages VG2 of drive transistors in pixel drive circuits that drive different light emitting elements to emit light are also different, and corresponding preset voltages applied at the spot S are also different.

In an exemplary implementation, due to different light emitting efficiencies of different light emitting elements, saturation voltages VG2 of drive transistors in the pixel drive circuits driving light emitting elements to emit red, green, and blue light are also different, and corresponding preset voltages applied to second electrodes of the drive transistors are also different. For example, light emitting efficiencies of the light emitting elements emitting red, green, and blue light decrease in turn, then drive currents needed for emitting light with a same brightness increase in turn, and gate-source voltages $V_{GS}$ of the drive transistors in the pixel circuit increase in turn, then the preset voltages applied to the second electrodes of the drive transistors may decrease in turn.

In an exemplary embodiment, in a display panel in which one pixel unit includes four sub-pixels, the four sub-pixels include two green sub-pixels, one red sub-pixel and one blue sub-pixel, the two green sub-pixels have different areas, the green sub-pixel with a smaller area needs a relatively small drive current and relatively small $V_{GS}$, then a preset voltage applied to a second electrode of a corresponding drive transistor may be relatively small.

In an exemplary implementation, a light emitting brightness of the light emitting element is determined by a drive current in a pixel drive circuit, and a preset voltage applied to a drive transistor in the pixel drive circuit may be adjusted according to a light emitting efficiency of the light emitting element, a wavelength of light emitted by the light emitting element, a light emitting area of the light emitting element. The light emitting efficiency of the light emitting element is high, the light emitting area is small, the wavelength of light emitted is large, then the preset voltage applied to a second electrode of the drive transistor is relatively small.

In an exemplary implementation, a light emitting element driven by a first pixel circuit emits red light, a light emitting element driven by a second pixel circuit emits green light, a light emitting element driven by a third pixel circuit emits blue light, and a light emitting element driven by a fourth pixel circuit emits white light.

In an exemplary implementation, a value of the first preset voltage is 3.3 volts to 3.7 volts, a value of the second preset voltage is 3.2 volts to 3.6 volts, a value of the third preset voltage is 3 volts to 3.4 volts, and a value of the fourth preset voltage is 2.8 volts to 3.2 volts. For example, the value of the first preset voltage is 3.5 volts, the value of the second preset voltage is 3.4 volts, the value of the third preset voltage is 3.2 volts, and the value of the fourth preset voltage is 3 volts. In an exemplary implementation, the first preset voltage to the fourth preset voltage may be lowest voltages of a reference gamma curve correspondingly emitting red light, green light, blue light, and white light, respectively.

Figure 9:
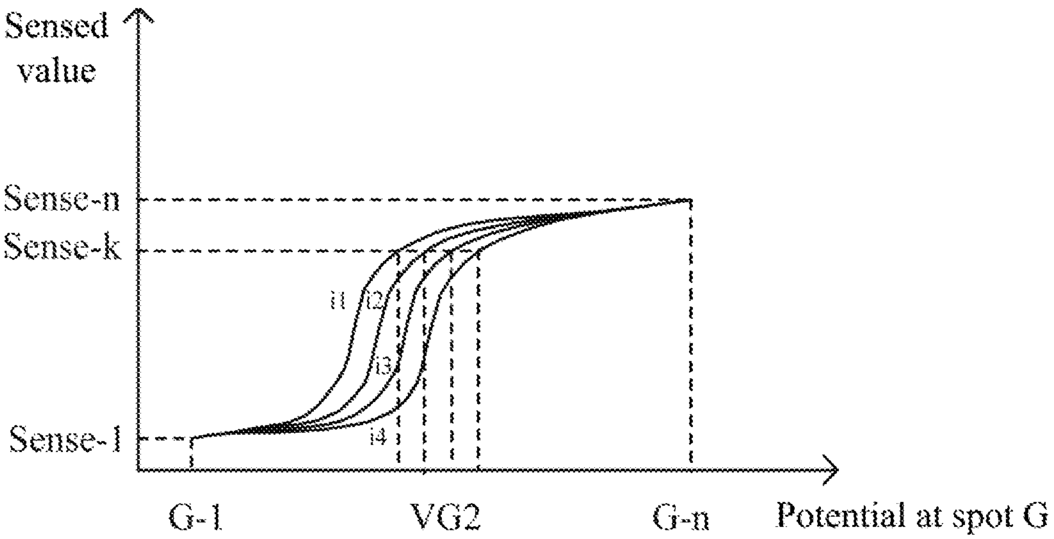
FIG. 9 shows a schematic diagram of a relationship between a potential at a spot G and a sensed value.

FIG. 9 shows relationships between sensed values and potentials at spot G in different pixel drive circuits, wherein a first curve i1 to a fourth curve i4 show relationships between potentials at spot G and sensed values in the first pixel drive circuit to the fourth pixel drive circuit, respectively. As can be seen from FIG. 9, in a situation in which a sensed value is greater than Sense-k, a difference between the sensed value and a maximum sensed value Sense-n is not large, and potentials VG2 at the spot G corresponding to the sensed value Sense-k increase in turn on the first curve i1 to the fourth curve i4, that is, among the potentials of VG2 corresponding to the sensed value Sense-k, VG2 on the first curve i1 is less than VG2 on the second curve i2, VG2 on the second curve i2 is less than VG2 on the third curve i3, and VG2 on the third curve i3 is less than VG2 on the fourth curve i4.

In an exemplary implementation, VG2 on the first curve i1 may be the same as the lowest voltage V9(4) on the fourth gamma curve L4 in FIG. 8, VG2 on the second curve i2 may be the same as the lowest voltage V9(3) on the third gamma curve L3 in FIG. 8, VG2 on the third curve i3 may be the same as the lowest voltage V9(2) on the second gamma curve L2 in FIG. 8, and VG2 on the fourth curve i4 may be the same as the lowest voltage V9(1) on the first gamma curve L1 in FIG. 8. In an exemplary implementation, the first curve i1 corresponds to a same pixel drive circuit as the curve L4, the second curve i2 corresponds to a same pixel drive circuit as the curve L3, the third curve i3 corresponds to a same pixel drive circuit as the curve L2, and the fourth curve i4 corresponds to a same pixel drive circuit as the curve L1.

In an exemplary implementation, considering that the greater the VG2 in the first curve i1 to the fourth curve i4, the greater an drive current actually needed, the greater a gate-source voltage difference $V_{GS}$ needed to drive a transistor, and a preset voltage applied to a second electrode of the drive transistor is relatively small. In a practical application, a value of the preset voltage is set according to a light emitting efficiency of a light emitting element driven by a pixel drive circuit, for example, VG2 on the first curve i1 may be the same as the lowest voltage V9(1) on the first gamma curve L1 in FIG. 8, VG2 on the second curve i2 may be the same as the lowest voltage V9(2) on the second gamma curve L2 in FIG. 8, VG2 on the third curve i3 may be the same as the lowest voltage V9(3) on the third gamma curve L3 in FIG. 8, VG2 on the fourth curve i4 may be the same as the lowest voltage V9(4) on the fourth gamma curve L4 in FIG. 8, so that gate-source voltage differences $V_{GS}$ of drive transistors corresponding to the first curve i1 to the fourth curve i4 increase in turn. In an exemplary implementation, the first curve i1 corresponds to a same pixel drive circuit as the curve L1, the second curve i2 corresponds to a same pixel drive circuit as the curve L2, the third curve i3 corresponds to a same pixel drive circuit as the curve L3, and the fourth curve i4 corresponds to a same pixel drive circuit as the curve L4.

In an exemplary implementation, applying a data voltage acquired based on a reference gamma curve to the third electrode of the drive transistor may include: acquiring a gray scale value, selecting a gamma voltage corresponding to the gray scale value from multiple gamma voltages of the reference gamma curve, obtaining the data voltage according to the selected gamma voltage, and applying the data voltage to the third electrode of the drive transistor.

In an exemplary implementation, before applying a preset voltage to the second electrode of the drive transistor, the method further includes: acquiring a gray scale value, acquiring a first voltage and a second voltage according to the gray scale value, the reference gamma curve, and the standard gamma curve, wherein the first voltage is a gamma voltage corresponding to the gray scale value in the reference gamma curve, the second voltage is a standard gamma voltage corresponding to the gray scale value in the standard gamma curve, and the first voltage is greater than the second voltage; and using a difference value between the first voltage and the second voltage as the preset voltage.

In an exemplary implementation, after the driver chip acquires a gray scale value, it finds a standard gamma voltage corresponding to a standard gamma curve corresponding to the gray scale value as a second voltage, finds a reference gamma voltage corresponding to a reference gamma curve corresponding to the gray scale value as a first voltage, and applies a voltage difference value obtained by subtracting the second voltage from the first voltage to a second electrode of a drive transistor (i.e., the spot S in FIG. 3), so that a gate-source voltage VGS of the drive transistor T2 corresponding to a different reference gamma voltage remains unchanged, so that a drive current will not change due to the VGS, improving the display effect.

After testing, by applying the preset voltage to the second electrode of the drive transistor, after the lowest voltage of the reference gamma curve is raised relative to the lowest voltage of the standard gamma curve, a difference of different sensed values corresponding to different potentials at spot G is reduced to 50% to 90% of the original. For example, the preset voltage is 3V, the lowest voltage of the reference gamma curve is 3V (the lowest voltage of the standard gamma curve is 0V or 0.25V), and the difference of the different sensed values corresponding to the different potentials at the spot G may be reduced to about 70% of the original.

In an embodiment of the present disclosure, a reference gamma voltage (the abscissa shown in FIG. 6*b*) on a reference gamma curve may be acquired from a processor (FPGA) by a source driver chip, a data voltage is obtained by converting the reference gamma voltage in a digital form into an analog voltage (the ordinate in FIG. 6*b*) by the source driver chip, and the data voltage is provided to a data line DL and written to a third electrode of the drive transistor T2 via the first transistor T1.

An embodiment of the present disclosure also provides another driving method, which may be applied to a pixel drive circuit, wherein the method includes: acquiring a first sensed data and a first compensation data corresponding to the first sensed data, wherein the first compensation data is a difference value between a pre-stored maximum sensed data and a theoretical sensed data corresponding to the first sensed data; and compensating the first sensed data by using the first compensation data to obtain a compensated sensed data.

By the driving method according to an embodiment of the present disclosure, the first sensed data and the first compensation data corresponding to the first sensed data are acquired, the first compensation data being the difference value between the pre-stored maximum sensed data and the theoretical sensed data corresponding to the first sensed data; and the first sensed data is compensated by using the first compensation data to obtain the compensated sensed data. In a situation in which the compensated sensed data is used for an external compensation, a technical problem that horizontal stripes appear on a display picture due to a large difference of sensed data (sensed values) is overcome.

Figure 10:
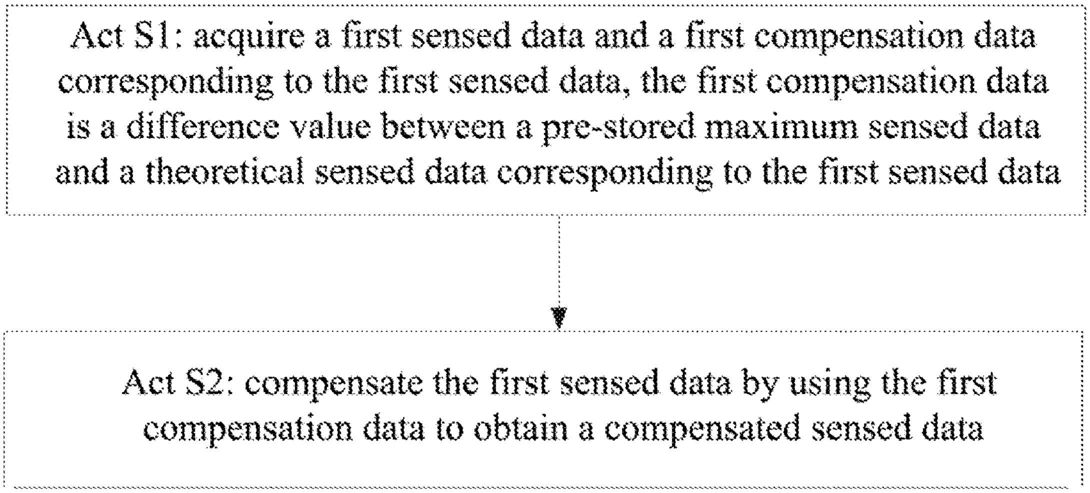
FIG. 10 shows a flowchart of a driving method according to an exemplary embodiment of the present disclosure.

As shown in FIG. 10, a driving method may include the following acts S1 to S2.

In the act S1, a first sensed data and a first compensation data corresponding to the first sensed data are acquired, wherein the first compensation data is a difference value between a pre-stored maximum sensed data and a theoretical sensed data corresponding to the first sensed data.

In the act S2, the first sensed data is compensated by using the first compensation data to obtain a compensated sensed data.

Figure 11:
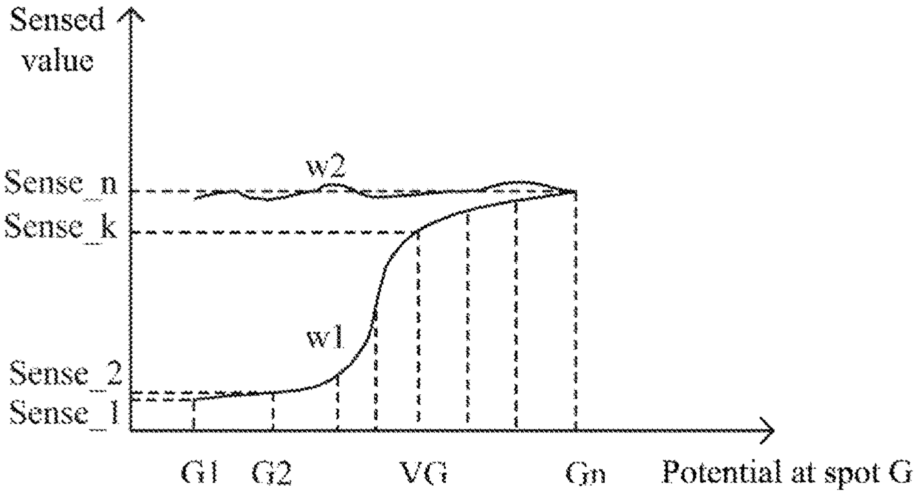
FIG. 11 shows a schematic diagram of a relationship between a potential at a spot G and a sensed value.

In an exemplary implementation, the first sensed data may be a sensed value, as shown in FIG. 11, a curve w1 is a relationship between the first sensed data and a potential of a third electrode of a drive transistor (i.e., a potential at a spot G), and w2 is a relationship between the compensated sensed data and the potential of the third electrode of the drive transistor (i.e., the potential at the spot G). After testing, the compensated sensed data fluctuates in a range of 6% to 14% at different potentials at spot G. For example, a difference between the compensated sensed data is 10% (that is, a difference between a maximum sensed value and a minimum sensed value is about 10%), and the compensated sensed data is less affected by a potential at spot G.

In an exemplary implementation, compensating the first sensed data by using the first compensation data to obtain the compensated sensed data may include: adding the first compensation data on the basis of the first sensed data to obtain the compensated sensed data.

In an exemplary implementation, a random access memory (DDR) may be used for storing multiple first compensation data corresponding to different potentials G1 to Gn at spot G, the first compensation data being difference values between a maximum sensed data Sense_n and multiple theoretical sensed data Sense_1 to Sense_n, as shown in Table 1, the theoretical sensed data being the sensed data corresponding to the potentials at the spot G before the compensation.

TABLE 1

| Potential at a spot G | Theoretical sensed data | Acquired first sensed data | First compensation data | Compensated sensed data |
|---|---|---|---|---|
| G1 | Sense_1 | Sense_01 | Sense_n − Sense_1 | Sense_01 + Sense_n − Sense_1 |
| G2 | Sense_2 | Sense_02 | Sense_n − Sense_2 | Sense_02 + Sense_n − Sense_2 |
| G3 | Sense_3 | Sense_03 | Sense_n − Sense_3 | Sense_03 + Sense_n − Sense_3 |
| . . . | . . . | . . . | . . . | . . . |
| Gn | Sense_n | Sense_0n | Sense_n − Sense_n | Sense_0n + Sense_n − Sense_n |

In an exemplary implementation, after the act S2, it may also include: a second compensation data is calculated according to the compensated sensed data. The second compensation data is used for an external compensation.

In an exemplary implementation, a pixel drive circuit may include a drive transistor, wherein the drive transistor may include a third electrode; and after the second compensation data is calculated according to the compensated sensed data, the method further includes: an image data is acquired, the image data is compensated according to the second compensation data to obtain a compensated image data, a data voltage is obtained according to the compensated image data, and the data voltage is applied to the third electrode of the drive transistor.

In an exemplary implementation, the second compensation data is calculated according to the compensated sensed data by the following formula:

$$K = \frac{1}{a\sqrt{VSMP}},$$

wherein K is the second compensation data, a is a constant, and VSMP is a value of the compensated sensed data.

Figure 12:
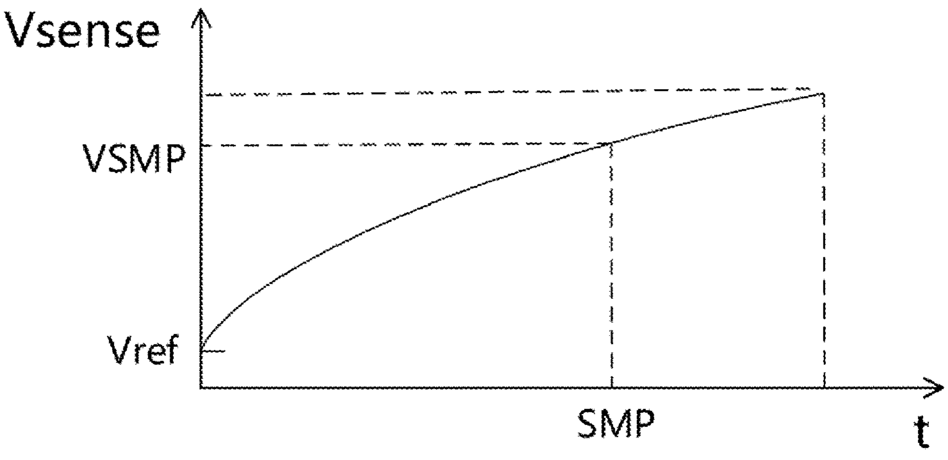
FIG. 12 shows a schematic diagram of compensated sensed data according to an exemplary embodiment of the present disclosure.

In an exemplary implementation, the second compensation data may be a mobility of the drive transistor, as shown in FIG. 12, the ordinate is a sensed data Vsense after the compensation, the abscissa is time t, and Vref is a reference voltage applied to a sensing line SL in a sensing phase. A value of K is calculated by using the compensated sensed data, so that the value of K is less affected by a potential at a spot G, which may avoid horizontal stripes produced due to a difference between values of K during displaying of a dynamic picture, improving a display effect of pictures.

In an exemplary implementation, the pixel drive circuit may include a drive transistor, wherein the drive transistor may include a third electrode. Before the first sensed data is acquired, the method further includes: multiple voltage data of the third electrode of the drive transistor and multiple theoretical sensed data corresponding to the multiple voltage data are acquired; and difference values between the second sensed data and the multiple theoretical sensed data are acquired to obtain the first compensation data corresponding to the multiple voltage data; the second sensed data is the maximum sensed data among the multiple theoretical sensed data.

In an exemplary implementation, the multiple voltage data of the third electrode of the drive transistor are the multiple potentials (G1 to Gn) at the spot G in Table 1, and the multiple theoretical sensed data are the sensed values Sense_1 to Sense_n corresponding to the multiple potentials at the spot G in FIG. 11.

In an exemplary implementation, the first compensation data corresponding to the first sensed data is acquired, which may include: a corresponding voltage data of a third electrode is found according to the first sensed data, and a corresponding first compensation data is found according to the voltage data of the third electrode.

In an exemplary implementation, the first compensation data corresponding to the first sensed data is acquired, which includes: the first compensation data is obtained by subtracting the first sensed data from the pre-stored maximum sensed data, or the corresponding theoretical sensed data is found according to the first sensed data, and the corresponding first compensation data is found according to the theoretical sensed data.

Figure 13:
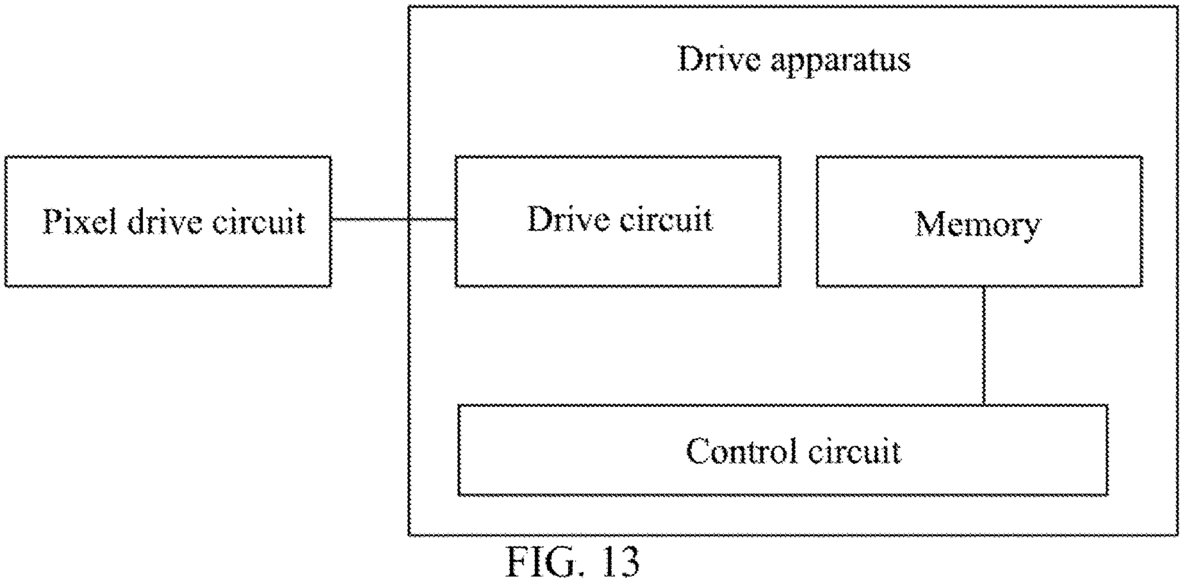
FIG. 13 shows a schematic diagram of a drive apparatus according to an exemplary embodiment of the present disclosure.

An embodiment of the present disclosure also provides a drive apparatus, applied to a pixel drive circuit, wherein the pixel drive circuit includes a drive transistor, the drive transistor including a second electrode and a third electrode; as shown in FIG. 13, the drive apparatus may include: a drive circuit, a control circuit, and a memory; the memory is connected with the control circuit and is configured to store a preset voltage; the drive circuit is connected with the pixel drive circuit and is configured to apply a data voltage acquired based on a reference gamma curve to the third electrode of the drive transistor; a lowest voltage of the reference gamma curve is greater than a lowest voltage of a standard gamma curve; the control circuit is connected with the memory and is configured to apply the preset voltage to the second electrode of the drive transistor; and the preset voltage is less than or equal to the lowest voltage of the reference gamma curve.

In an exemplary implementation, the drive circuit may be connected with an external system, and configured to receive image data and a timing signal of the external system, acquire a corresponding gray scale value according to the image data, select a gamma voltage corresponding to the gray scale value from multiple gamma voltages of the reference gamma curve, obtain a data voltage according to the selected gamma voltage, and apply the data voltage to the third electrode of the drive transistor. In an exemplary implementation, the above apparatus may further include a controller, wherein the drive circuit is connected with the external system through the controller, the controller receives the image data and the timing signal of the external system, and acquires a corresponding gray scale value according to the image data, and the drive circuit selects a gamma voltage corresponding to the gray scale value from multiple gamma voltages of the reference gamma curve, obtains a data voltage according to the selected gamma voltage, and applies the data voltage to the third electrode of the drive transistor.

Figure 14:
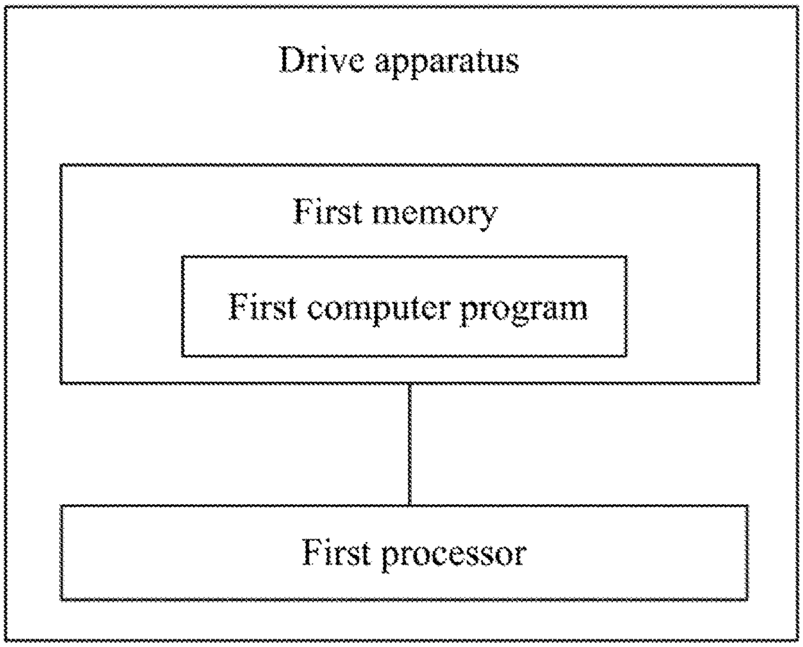
FIG. 14 shows a schematic diagram of a drive apparatus according to an exemplary embodiment of the present disclosure.

In an exemplary implementation, the drive circuit may be connected with an external system, and configured to receive image data and a timing signal of the external system, acquire a corresponding gray scale value according to the image data, and acquire a first voltage and a second voltage according to the gray scale value, the reference gamma curve, and the standard gamma curve, the first voltage being a gamma voltage corresponding to the gray scale value in the reference gamma curve, the second voltage being a standard gamma voltage corresponding to the gray scale value in the standard gamma curve, and the first voltage being greater than the second voltage; a difference value between the first voltage and the second voltage is used as the preset voltage. In an exemplary implementation, the above apparatus may further include a controller, wherein the drive circuit is connected with an external system through the controller, the controller receives image data and a timing signal of the external system, and acquires a corresponding gray scale value according to the image data, and the drive circuit acquires a first voltage and a second voltage according to the gray scale value, the reference gamma curve, and the standard gamma curve, and a difference value between the first voltage and the second voltage is used as the preset voltage. An embodiment of the present disclosure also provides another drive apparatus, applied to a pixel drive circuit, wherein the pixel drive circuit includes a drive transistor, the drive transistor includes a second electrode and a third electrode. As shown in FIG. 14, the drive apparatus may include a first memory, a first processor, and a first computer program stored on the first memory and capable of being run on the first processor to perform following operations: applying a data voltage acquired based on a reference gamma curve to the third electrode of the drive transistor, and applying a preset voltage to the second electrode of the drive transistor; wherein a lowest voltage of the reference gamma curve is greater than a lowest voltage of a standard gamma curve, and the preset voltage is less than or equal to the lowest voltage of the reference gamma curve.

Figure 15:
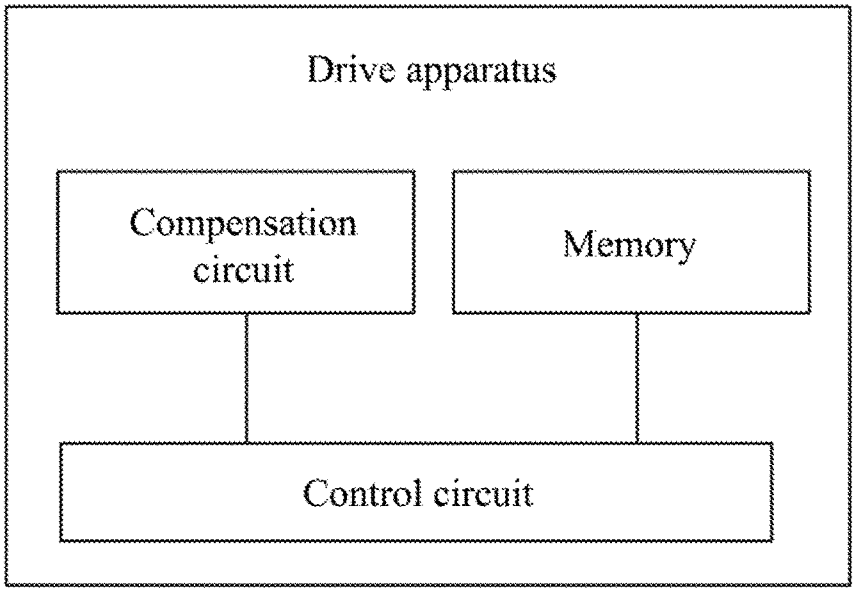
FIG. 15 shows a schematic diagram of a drive apparatus according to an exemplary embodiment of the present disclosure.

An embodiment of the present disclosure also provides another drive apparatus, as shown in FIG. 15, which may include: a control circuit, a compensation circuit, and a memory. The memory is connected with the control circuit and is configured to store difference values between a maximum sensed data and multiple theoretical sensed data; the control circuit is connected with the memory and the compensation circuit, and is configured to acquire a first sensed data and a first compensation data corresponding to the first sensed data, wherein the first compensation data is a difference value between a pre-stored maximum sensed data and a theoretical sensed data corresponding to the first sensed data; and the compensation circuit is connected with the control circuit and is configured to compensate the first sensed data by using the first compensation data to obtain compensated sensed data.

In an exemplary implementation, the control circuit is further configured to calculate the second compensation data according to the compensated sensed data.

Figure 16:
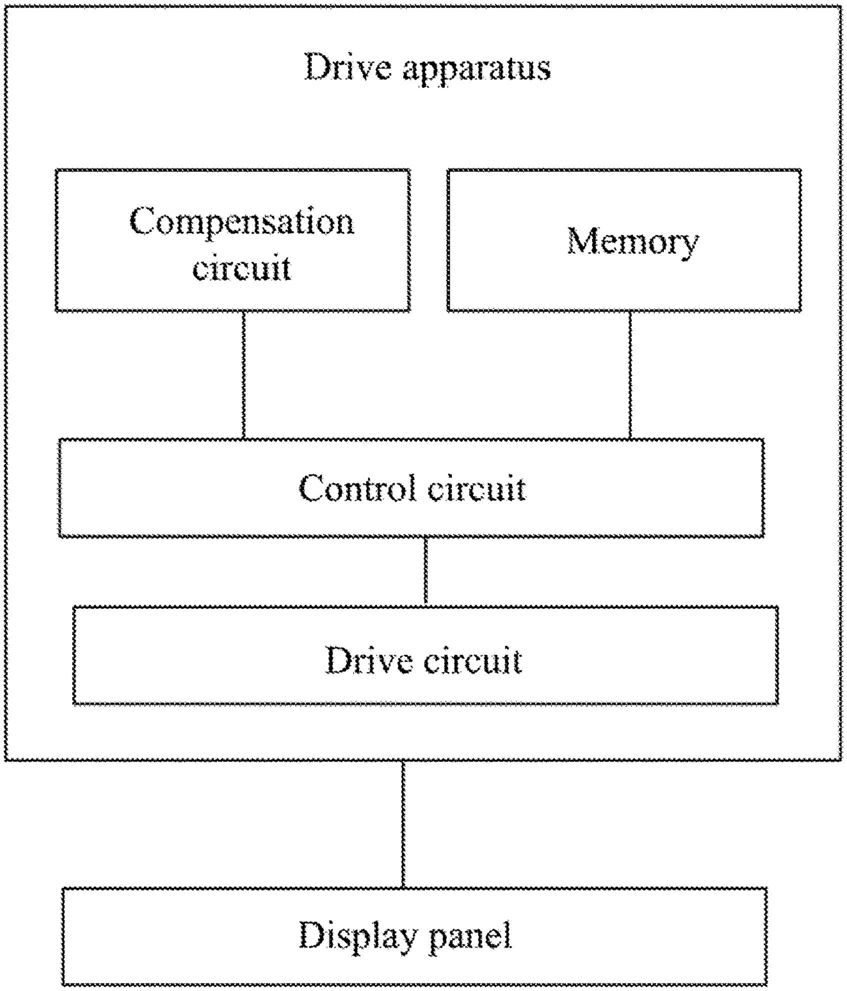
FIG. 16 shows a schematic diagram of a drive apparatus according to an exemplary embodiment of the present disclosure.

In an exemplary implementation, as shown in FIG. 16, the apparatus may further include a drive circuit, wherein the drive circuit is connected with a control circuit, the control circuit is further configured to acquire image data, compensate the image data according to the second compensation data to obtain compensated image data, and obtain a data voltage according to the compensated image data; and the drive circuit is configured to apply the data voltage to the third electrode of the drive transistor.

In an exemplary implementation, the drive circuit is further connected with a pixel drive circuit and is configured to acquire multiple voltage data of the third electrode of the drive transistor and multiple theoretical sensed data corresponding to the multiple voltage data; the control circuit is further configured to obtain difference values between the second sensed data and the multiple theoretical sensed data to obtain the first compensation data corresponding to the multiple voltage data; the second sensed data is the maximum sensed data among the multiple theoretical sensed data; and the memory is further configured to store difference values between the second sensed data and the multiple theoretical sensed data.

Figure 17:
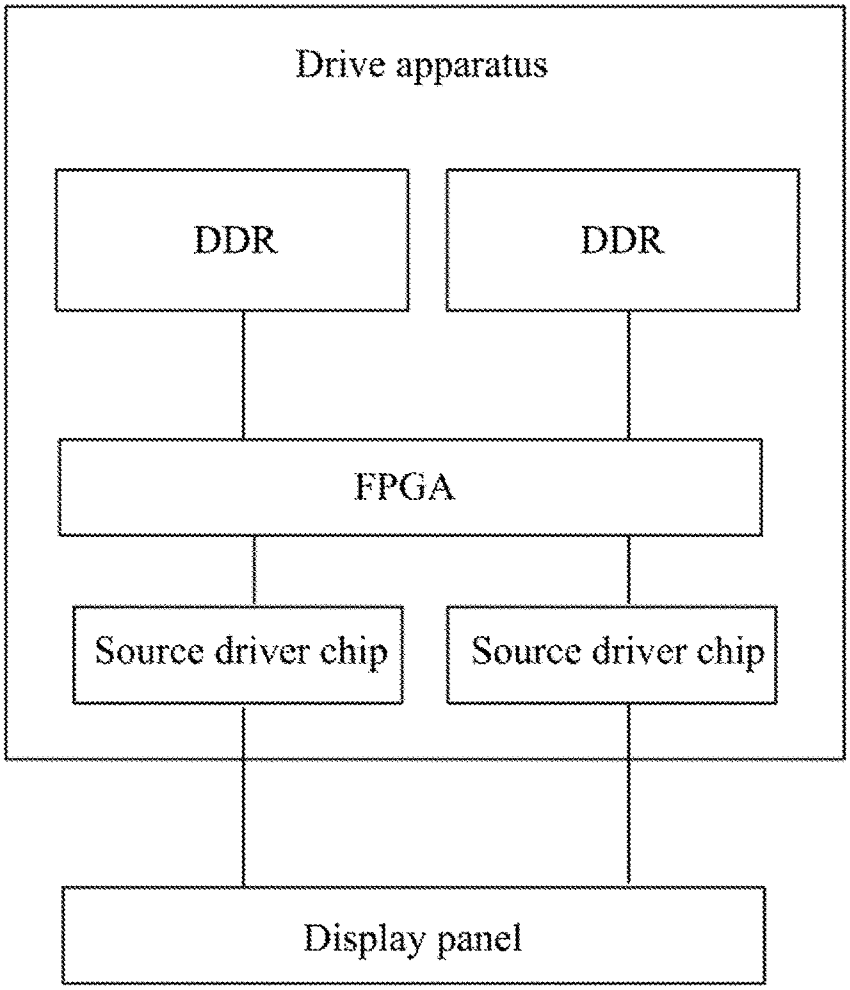
FIG. 17 shows a schematic diagram of a drive apparatus according to an exemplary embodiment of the present disclosure.

As shown in FIG. 17, the control circuit may include a controller, for example, the controller may be FPGA. The drive circuit may include multiple source driver chips or source drivers. A display panel is provided with multiple pixel drive circuits. The control circuit is respectively connected with multiple memories and multiple drive circuits. A source driver chip is connected with a pixel drive circuit, and is configured to acquire a data voltage of a spot G and the theoretical sensed data of the pixel drive circuit on the display panel. The compensation circuit may be integrated into the FPGA. The memory may be a random access memory (DDR).

Figure 18:
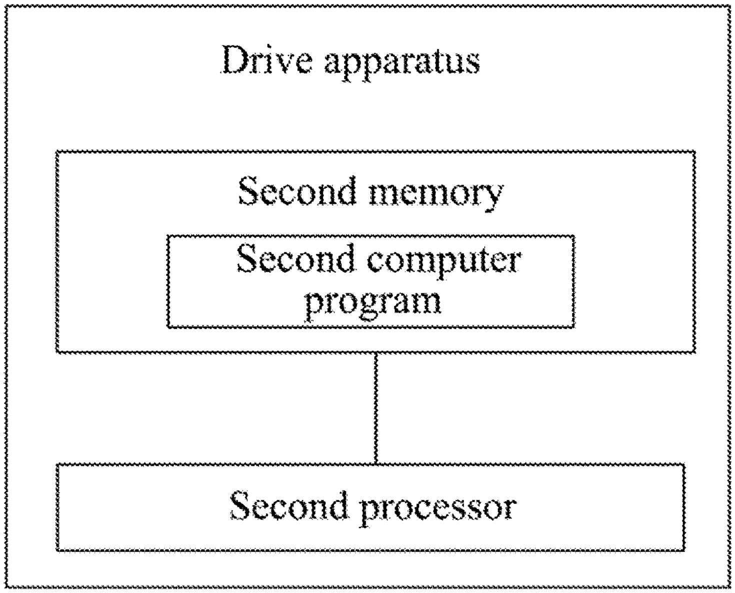
FIG. 18 shows a schematic diagram of a drive apparatus according to an exemplary embodiment of the present disclosure.

An embodiment of the present disclosure also provides another drive apparatus, as shown in FIG. 18, which may include a second memory, a second processor, and a second computer program stored on the second memory and capable of being run on the second processor, to perform following operations: acquiring a first sensed data and a first compensation data corresponding to the first sensed data, wherein the first compensation data is a difference value between a pre-stored maximum sensed data and a theoretical sensed data corresponding to the first sensed data; and compensating the first sensed data by using the first compensation data to obtain a compensated sensed data.

In an embodiment of the present disclosure, a second electrode may be a source electrode of a drive transistor, a third electrode may be a control electrode of the drive transistor, and a first electrode may be a drain electrode of the drive transistor. Herein, functions of the source electrode and the drain electrode may be exchanged with each other, or the source electrode and the drain electrode may be exchanged with each other in combination with an actual situation.

An embodiment of the present disclosure also provides a non-transitory computer-readable storage medium, configured to store computer program instructions, wherein when the computer program instructions are executed, the driving method according to any one of the above embodiments can be implemented.

With the driving method and the apparatus, and the storage medium according to the embodiments of the present disclosure, by applying the data voltage acquired based on the reference gamma curve to the third electrode of the drive transistor, and applying the preset voltage to the second electrode of the drive transistor, the lowest voltage of the reference gamma curve is greater than the lowest voltage of the standard gamma curve, and the preset voltage is less than or equal to the lowest voltage of the reference gamma curve, a technical problem that horizontal stripes appear in a process for displaying a picture is overcome, improving a display quality of the picture. With another driving method, by acquiring the first sensed data and the first compensation data corresponding to the first sensed data, the first compensation data being the difference value between the prestored maximum sensed data and the theoretical sensed data corresponding to the first sensed data, and compensating the first sensed data by using the first compensation data to obtain the compensated sensed data, a technical problem that horizontal stripes appear in displaying a picture is overcome, improving a display quality of the picture.

The drawings of the embodiments of the present disclosure only involve structures involved in the embodiments of the present disclosure, and other structures may refer to a general design.

The embodiments of the present disclosure, that is, features in the embodiments, may be combined with each other to obtain a new embodiment in a situation of no conflicts.

Although the implementations disclosed in the embodiments of the present disclosure are described above, contents are only implementations for facilitating understanding of the embodiments of the present disclosure, but are not intended to limit the embodiments of the present disclosure. Any person skilled in the art to which the embodiments of the present disclosure pertain may make any modifications and variations in forms and details of implementation without departing from the spirit and the scope disclosed in the embodiments of the present disclosure. Nevertheless, the scope of patent protection of the embodiments of the present disclosure shall still be subject to the scope defined by the appended claims.

The invention claimed is:

1. A driving method, applied to a pixel drive circuit, wherein the pixel drive circuit comprises a drive transistor, the drive transistor comprising a second electrode and a third electrode; and the method comprises:

applying a data voltage acquired based on a reference gamma curve to the third electrode of the drive transistor, and applying a preset voltage to the second electrode of the drive transistor; wherein a lowest voltage of the reference gamma curve is greater than a lowest voltage of a standard gamma curve, and the preset voltage is less than or equal to the lowest voltage of the reference gamma curve;

wherein the lowest voltage of the reference gamma curve is M times a highest voltage of the standard gamma curve, and a highest voltage of the reference gamma curve is N times the highest voltage of the standard gamma curve, wherein the M is greater than or equal to 0.18, the N is greater than or equal to 1, and the N is greater than the M.

2. The driving method of claim 1, wherein the preset voltage is greater than the lowest voltage of the standard gamma curve.

3. The driving method of claim 2, wherein a highest voltage of the reference gamma curve is same as a highest voltage of the standard gamma curve.

4. The driving method of claim 1, wherein the preset voltage is 2 volts to 5 volts.

5. The driving method of claim 1, wherein the M is greater than or equal to 1, and the N is greater than or equal to 2.

6. The driving method of claim 1, wherein a difference value between the N and the M is 0.6 to 1.5.

7. The driving method of claim 1, wherein the lowest voltage of the reference gamma curve is 12 volts to 20 volts, and the highest voltage of the reference gamma curve is 28 volts to 36 volts.

8. The driving method of claim 1, wherein the pixel drive circuit is configured to drive a light emitting element to emit light, the pixel drive circuit comprises a first pixel drive circuit, a second pixel drive circuit, and a third pixel drive circuit; and applying the preset voltage to the second electrode of the drive transistor comprises applying a first preset voltage to a second electrode of a drive transistor in the first pixel drive circuit, applying a second preset voltage to a second electrode of a drive transistor in the second pixel drive circuit, and applying a third preset voltage to a second electrode of a drive transistor in the third pixel drive circuit; wherein the first preset voltage is greater than the second preset voltage, and the second preset voltage is greater than the third preset voltage.

9. The driving method of claim 8, wherein the pixel drive circuit further comprises a fourth pixel drive circuit, and applying the preset voltage to the second electrode of the drive transistor further comprises applying a fourth preset voltage to a second electrode of a drive transistor in the fourth pixel drive circuit, wherein the fourth preset voltage is less than the third preset voltage.

10. The driving method of claim 9, wherein applying the data voltage acquired based on the reference gamma curve to the third electrode of the drive transistor comprises:

applying a data voltage acquired based on a first reference gamma curve to a third electrode of the drive transistor in the first pixel drive circuit; applying a data voltage acquired based on a second reference gamma curve to a third electrode of the drive transistor in the second pixel drive circuit; applying a data voltage acquired based on a third reference gamma curve to a third electrode of the drive transistor in the third pixel drive circuit; and applying a data voltage acquired based on a fourth reference gamma curve to a third electrode of the drive transistor in the fourth pixel drive circuit, wherein highest voltages of the first reference gamma curve to the fourth reference gamma curve are same.

11. The driving method of claim 9, wherein a light emitting element driven by the first pixel circuit emits red light, a light emitting element driven by the second pixel circuit emits green light, a light emitting element driven by the third pixel circuit emits blue light, and a light emitting element driven by the fourth pixel circuit emits white light, wherein a value of the first preset voltage is 3.3 volts to 3.7 volts, a value of the second preset voltage is 3.2 volts to 3.6 volts, a value of the third preset voltage is 3 volts to 3.4 volts, and a value of the fourth preset voltage is 2.8 volts to 3.2 volts.

12. A driving method, applied to a pixel drive circuit, wherein the pixel drive circuit comprises a drive transistor, the drive transistor comprising a second electrode and a third electrode; and the method comprises:

applying a data voltage acquired based on a reference gamma curve to the third electrode of the drive transistor, and applying a preset voltage to the second electrode of the drive transistor; wherein a lowest voltage of the reference gamma curve is greater than a lowest voltage of a standard gamma curve, and the preset voltage is less than or equal to the lowest voltage of the reference gamma curve;

wherein applying the data voltage acquired based on the reference gamma curve to the third electrode of the drive transistor comprises:

acquiring a gray scale value, selecting a gamma voltage corresponding to the gray scale value from a plurality of gamma voltages of the reference gamma curve, obtaining the data voltage according to the selected gamma voltage, and applying the data voltage to the third electrode of the drive transistor, wherein before applying the preset voltage to the second electrode of the drive transistor, the method further comprises:

acquiring a gray scale value, acquiring a first voltage and a second voltage according to the gray scale value, the reference gamma curve, and the standard gamma curve, wherein the first voltage is a gamma voltage corresponding to the gray scale value in the reference gamma curve, the second voltage is a standard gamma voltage corresponding to the gray scale value in the standard gamma curve, and the first voltage is greater than the second voltage; and using a difference value between the first voltage and the second voltage as the preset voltage.

13. A drive apparatus, applied to a pixel drive circuit, wherein the pixel drive circuit comprises a drive transistor, the drive transistor comprises a second electrode and a third electrode; and the apparatus comprises a first memory, a first processor, and a first computer program stored on the first memory and capable of being run on the first processor to perform the following steps:

applying a data voltage acquired based on a reference gamma curve to the third electrode of the drive transistor, and applying a preset voltage to the second electrode of the drive transistor; wherein a lowest voltage of the reference gamma curve is greater than a lowest voltage of a standard gamma curve, and the preset voltage is less than or equal to the lowest voltage of the reference gamma curve, wherein the lowest voltage of the reference gamma curve is M times a highest voltage of the standard gamma curve, and a highest voltage of the reference gamma curve is N times the highest voltage of the standard gamma curve, wherein the M is greater than or equal to 0.18, the N is greater than or equal to 1, and the N is greater than the M; or, wherein applying the data voltage acquired based on the reference gamma curve to the third electrode of the drive transistor comprises: acquiring a gray scale value, selecting a gamma voltage corresponding to the gray scale value from a plurality of gamma voltages of the reference gamma curve, obtaining the data voltage according to the selected gamma voltage, and applying the data voltage to the third electrode of the drive transistor, and wherein before applying the preset voltage to the second electrode of the drive transistor, the method further comprises: acquiring a gray scale value, acquiring a first voltage and a second voltage according to the gray scale value, the reference gamma curve, and the standard gamma curve, wherein the first voltage is a gamma voltage corresponding to the gray scale value in the reference gamma curve, the second voltage is a standard gamma voltage corresponding to the gray scale value in the standard gamma curve, and the first voltage is greater than the second voltage; and using a difference value between the first voltage and the second voltage as the preset voltage.

* * * * *